(12) United States Patent
MacNeille et al.

(10) Patent No.: US 10,410,290 B2
(45) Date of Patent: Sep. 10, 2019

(54) VEHICLE DAMAGE DETECTOR

(71) Applicant: Ford Global Technologies, LLC, Dearborn, MI (US)

(72) Inventors: Perry Robinson MacNeille, Lathrup Village, MI (US); Oleg Yurievitch Gusikhin, Commerce Township, MI (US); Yimin Liu, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 728 days.

(21) Appl. No.: 15/080,202

(22) Filed: Mar. 24, 2016

(65) Prior Publication Data

US 2017/0278194 A1     Sep. 28, 2017

(51) Int. Cl.
| | |
|---|---|
| *G06Q 40/00* | (2012.01) |
| *G06Q 40/08* | (2012.01) |
| *G07C 5/08* | (2006.01) |
| *B60G 17/0185* | (2006.01) |

(52) U.S. Cl.
CPC .......... *G06Q 40/08* (2013.01); *B60G 17/0185* (2013.01); *G07C 5/0808* (2013.01); *B60G 2400/94* (2013.01); *B60G 2600/04* (2013.01); *B60G 2600/08* (2013.01); *B60G 2600/70* (2013.01); *G07C 5/0816* (2013.01)

(58) Field of Classification Search
CPC ..................................................... G06Q 40/08
USPC ...................................... 705/14.49; 701/31.4
See application file for complete search history.

(56) References Cited

U.S. PATENT DOCUMENTS

| | | |
|---|---|---|
| 8,595,034 B2 | 11/2013 | Bauer et al. |
| 8,606,512 B1 | 12/2013 | Bogovich et al. |
| 8,768,734 B2 | 7/2014 | Gryan et al. |
| 9,174,508 B2 | 11/2015 | Anderson et al. |
| 9,721,400 B1* | 8/2017 | Oakes, III ............ G07C 5/0808 |
| 2007/0118258 A1* | 5/2007 | Probst .................... G01M 17/04 701/31.4 |
| 2011/0213628 A1 | 9/2011 | Peak et al. |
| 2014/0277902 A1 | 9/2014 | Koch |
| 2014/0350970 A1 | 11/2014 | Schumann, Jr. et al. |
| 2015/0094948 A1 | 4/2015 | Lu et al. |
| 2015/0348058 A1* | 12/2015 | Liu ..................... G06Q 30/0251 705/14.49 |
| 2015/0370253 A1 | 12/2015 | Gurin |
| 2016/0046166 A1 | 2/2016 | Norton et al. |
| 2016/0046170 A1 | 2/2016 | Lu |
| 2016/0047666 A1 | 2/2016 | Fuchs |

OTHER PUBLICATIONS

Search Report dated Aug. 9, 2017 for GB Patent Application No. GB1704323.3 (4 pages).

(Continued)

*Primary Examiner* — Samica L Norman
(74) *Attorney, Agent, or Firm* — Frank Lollo; Neal, Gerber & Eisenberg LLP; James P. Muraff

(57) ABSTRACT

A vehicle damage detector includes: a vehicle with a motor, a suspension, a wheel, a sensor configured to report a suspension displacement; processor(s) configured to: estimate existing suspension damage based on the reports, project marginal future suspension damage based on a route and the existing suspension damage, calculate a marginal decrease in vehicle value from taking the projected route.

20 Claims, 6 Drawing Sheets

(56) References Cited

OTHER PUBLICATIONS

Tim Blakemore, Turned on by Telematics, Dec. $5^{th}$, E-flow SPIE.
Olugbenga Moses Anubi, Variable Stiffness Suspension System, from a Dissertation Presented to the Graduate School of the University of Florida in Partial Fulfillment of the Requirements for the Degree of Doctor of Philosophy, University of Florida, 2013, 191 pages.
Mike Blundell et al., The Multibody Systems Approach to Vehicle Dynamics, 2016, Chapter 4, pp. 185-334, second edition.
Bern Grush and Preet Khalsa, A New Paradigm for Using GNSS for Road Tolling, ION International Technical Meeting, Jan. 26-28, 2009, 6 pages, Anaheim, California.

* cited by examiner

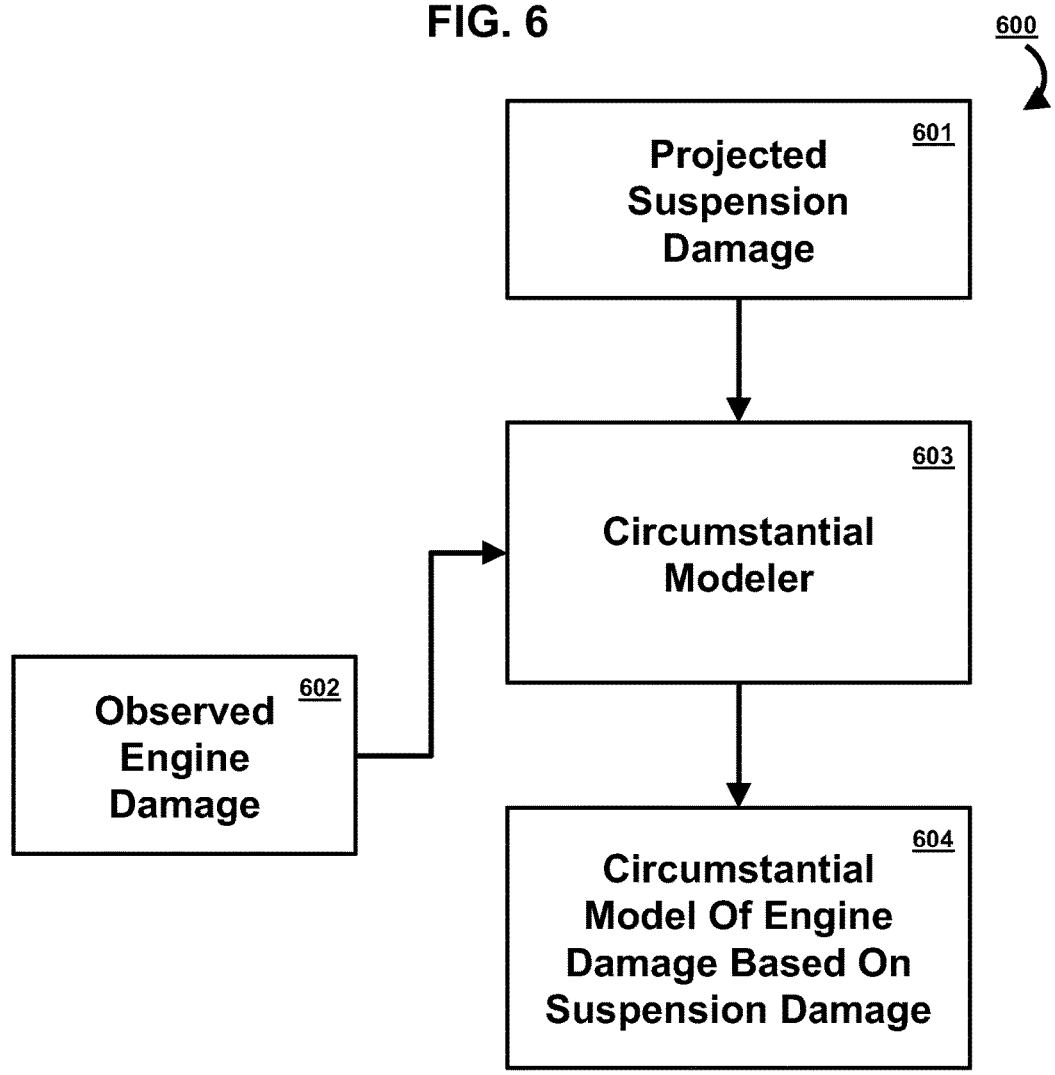

VEHICLE DAMAGE DETECTOR

TECHNICAL FIELD

This disclosure relates to estimating and projecting vehicle damage with mathematical models.

BACKGROUND

Vehicles sustain damage while traversing roads. The sustained damage varies according to the road, the kind of vehicle, driving conditions, and the present mechanical status of the vehicle. A need exists for a system that projects the sustained damage.

SUMMARY

The present disclosure resolves the above need with a vehicle damage detector including: a vehicle with a motor, a suspension, a wheel, a sensor configured to report a suspension displacement; processor(s) configured to: estimate existing suspension damage based on the reports, project marginal future suspension damage based on a route and the existing suspension damage, calculate a marginal decrease in vehicle value from taking the projected route.

The present disclosure resolves the above need with a method of detecting damage to a vehicle having a motor, a suspension, a wheel, and a sensor configured to report a suspension displacement, the method including: with processor(s): estimating existing suspension damage based on the reports, projecting marginal future suspension damage based on a route and the existing suspension damage, calculating a marginal decrease in vehicle value from taking the projected route.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 6 is a block diagram of a method for generating a circumstantial model.

DETAILED DESCRIPTION OF EXAMPLE EMBODIMENTS

Figure 1:
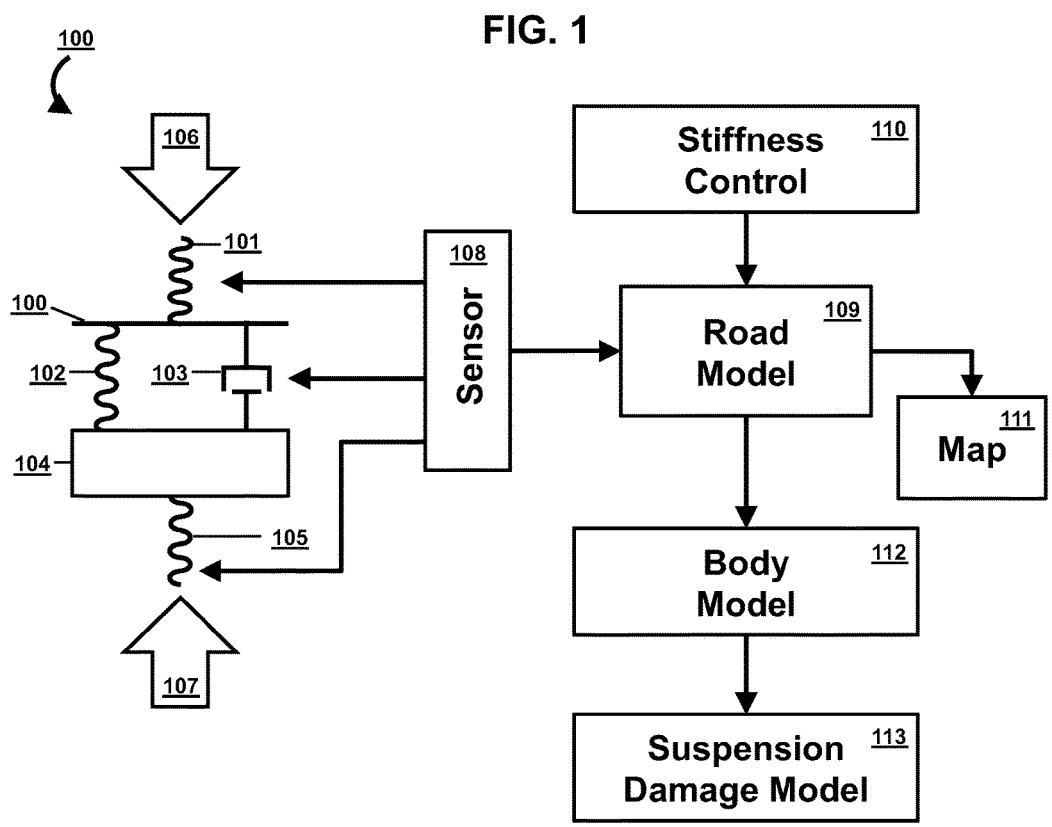
FIG. 1 is a block diagram of a method for finding suspension damage.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or".

Figure 5:
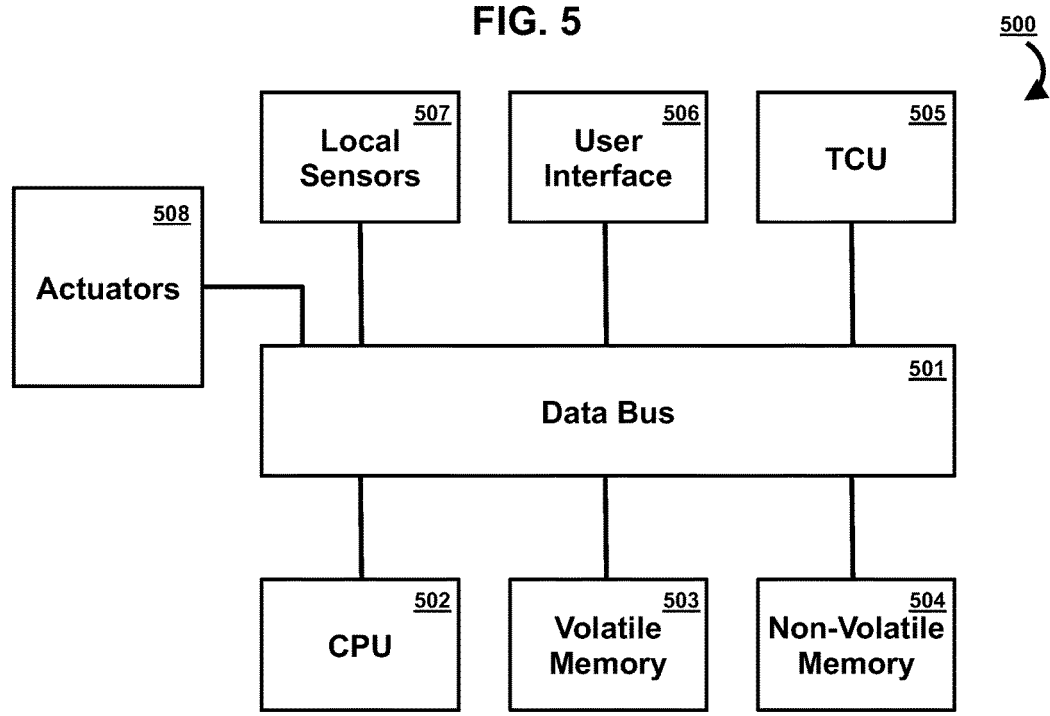
FIG. 5 is a block diagram of vehicle hardware.

FIG. 5 shows electronic components 501 to 508 of a vehicle 500. The vehicle 500 may be a sedan, an SUV, a truck, or a motorcycle. The vehicle may be gasoline powered, diesel powered, natural gas powered, hybrid, or electric. The vehicle may include an engine, motors, batteries, a transmission, seatbelts, windows, seats, brakes, and steering.

The electronic components of the vehicle communicate through a data bus 501. The data bus is in operative communication with a CPU 502, volatile memory 503 such as RAM, non-volatile memory 504 such as a hard drive or SSD, a telematics control unit 505 including one or more antennas for wireless communication, user interfaces 506 including touch-screen displays, knobs, buttons, and lights, local vehicle sensors 507 such as temperature sensors, distance sensors, humidity sensors, RPM sensors, and actuators 508 that control various mechanical components such as the transmission.

The vehicle 500 also includes a suspension enabling relative motion between the wheels and the vehicle frame. The suspension includes wheel suspensions corresponding to the one or more of the vehicle wheels. Each wheel suspension includes a rubber bushing, a strut with a main spring and a shock absorber, and a tire.

A wheel suspension model 100 simulates the movements or motion of each wheel suspension. The suspension model 100 includes a non-linear spring 101 representing the rubber bushing attached to a linear spring 102 representing the main spring and a non-linear damper 103 representing the shock absorber. The spring 102 and the damper 103 attach to a non-linear spring 105 representing the tire. The combined mass of the main spring, the shock absorber, and the tire is represented as a block attached between the spring 105, on the one hand, and the spring 102 and the damper 103, on the other hand.

Forces 106 and 107 act on the suspension model 100. If the vehicle has four wheels, then a downward force 106 represents forces acting on ¼ of the mass of the body of the vehicle. The downward forces 106 include gravitational force and a variable reactive force equal to ¼ of the mass of the body multiplied by the vertical acceleration of the body in the area directly above linear spring 101. An upward force 107 represents the force of the road. Suitable mathematical models exist that predict or estimate properties of springs and dampers respond to forces and displacements. For example, Variable Stiffness Suspension System by Olugbenga Moses Anubi, which is hereby incorporated by reference in its entirety, discloses suitable models.

While the vehicle is in motion, a suspension height sensor 108 measures the displacement of one or more of the springs and the damper by comparing a measured length to a known resting length. In some embodiments, the suspension height sensor 108 only measures the displacement of spring 102 and damper 103. In various embodiments, the length of the main spring and the shock absorber are assumed to be equal.

Simultaneously, a stiffness controller 110 actively adjusts one or more of a damping constant of the damper 103 and a spring constant of the spring 102. In some embodiments, the suspension height sensor 108 also measures the displacement of the tires. Suitable stiffness controllers are known in the art and disclosed, for example, in U.S. Pat. No. 9,174,508 and U.S. Publication No. 2016/0046166, both of which are hereby incorporated by reference in their entirety.

The suspension height sensor 108 feeds the displacements to a road model 109. At the same time, the stiffness controller 110 feeds the controlled damping and spring constants to the road model 109. The road model 109 collects similar data from suspension models of the other wheels. Using this data, the road model estimates the magnitude of forces 106 and 107. More specifically, the model starts with determining the mass of the vehicle, typically using the spring coefficient and the ride height sensor measurement at key-on. If the vehicle is heavily loaded the wear will be greater, and this effect is accounted for adjusting the mass of the vehicle (between 106-101) that is suspended. The model is driven by displacement at 107 caused by variability in the height of the road as the vehicle moves over it. The model predicts a reaction force 107 in response to the displacements. Chapter 4 of Modeling and Analysis of Suspension Systems The Multibody Systems Approach to Vehicle Dynamics by Michael Blundell and Damian Harty (Elsevier, Sep. 18, 2014), which is hereby incorporated by reference in its entirety, describes the model in greater detail.

When tires traverse the surface of the road, the tires expand and contract based on a roughness of the road. A rough road will result in a variable force 107 over time, whereas a smooth road will result in a relatively constant force 107 over time. The road model 109 tracks the magnitude of the road force 107 with time and estimates road roughness based on how often the magnitude of the road force 107 changes. In various embodiments, the road model 109 breaks a road into segments and assigns a roughness constant to each segment. The road model uploads the roughness constants to a roughness map 111, which associates the roughness constant with a segment of mapped road.

It should be appreciated that the model discussed above is ¼ suspension model. Other embodiments apply a ½ suspension model, which includes a single axel (left and right pair) modeled by two ¼ models with the body masses 106-101 connected by a rigid link and a links, springs and dashpots to model roll. Steering wheel change rate can be a useful input to the ½ suspension model. Alternatively, full suspension models can also be implemented to provide a more comprehensive model that is more accurate, but also more difficult to solve. A full model considers pitch in addition to roll and independent wheel movement, and brake torque can be a useful input.

Figure 4:
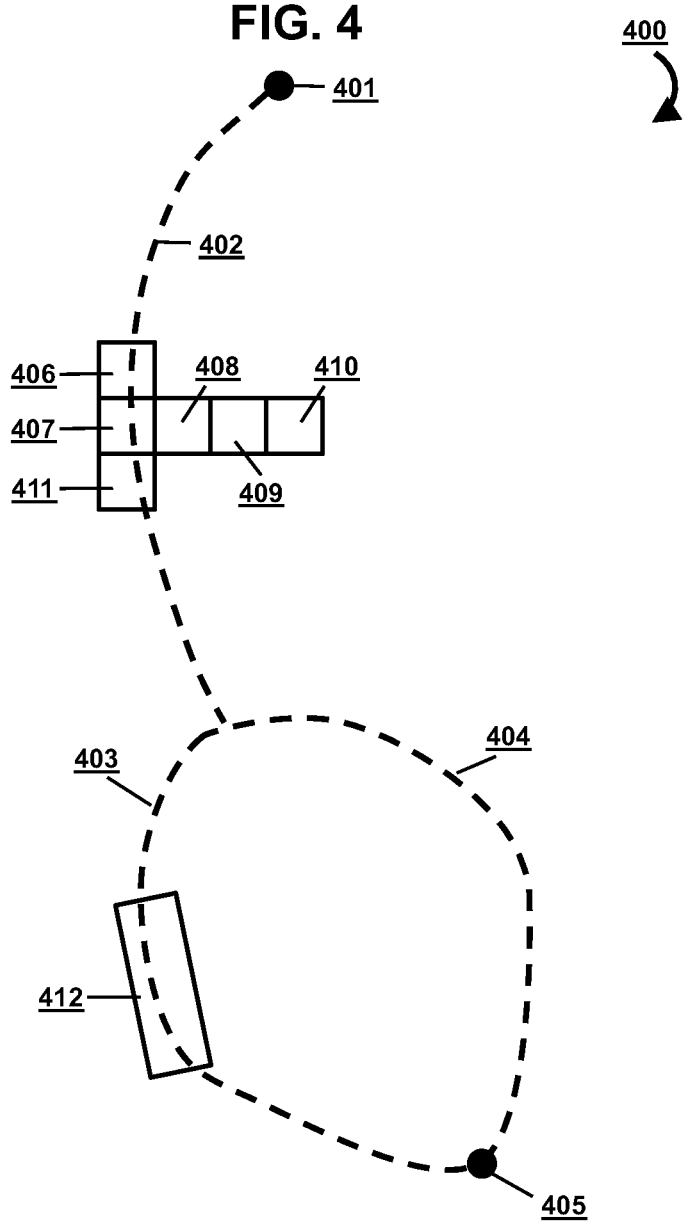
FIG. 4 is an example map segmented into various models.

Turning to FIG. 4, an example map 400 is generally shown and illustrated. The starting point is 401. The end point is 405. One possible route is 402 and 403. Another possible route is 402 and 404. Boxes 406 to 412 represent road models corresponding to road segments. The road segments may be uniform (see boxes 406 to 411) or variable (compare box 406 with box 412). In some embodiments, the road is segmented according to a degree of accuracy of the corresponding road model. For example, one road model may sufficiently describe all of 403.

With reference to boxes 407 to 410, one segment of the road may include a plurality of road models. For example, model 407 may correspond to the roughness of the road. Model 408 may correspond to the traffic of the road. Model 409 may correspond to the inclination of the road. Model 410 may correspond to a circumstantial model, which is described in greater detail below.

Returning to FIG. 1, after the road model estimates the force of the road 107, a body model 112 estimates the force of the body 106 bearing down on the suspension in light of the force 107, the known mass 104 of the tire and struts, and the known displacements of the springs and the damper. More specifically, the model predicts the road surface displacement (so the road roughness can be characterized), the force and displacement of the dashpot and spring and the tire from the time series of suspension height measurements.

The damage model 113 estimates the remaining service life or damage of at least one of the tire, the main spring, and the shock absorber. A spring damage model would have the number and depth of the spring cycles which can be estimated from a time domain filter of the displacement from the model. The product of force on the dashpot and its displacement integrated over time will give the accumulated energy absorbed by the dashpot, and primary input to the damage model.

Figure 2:
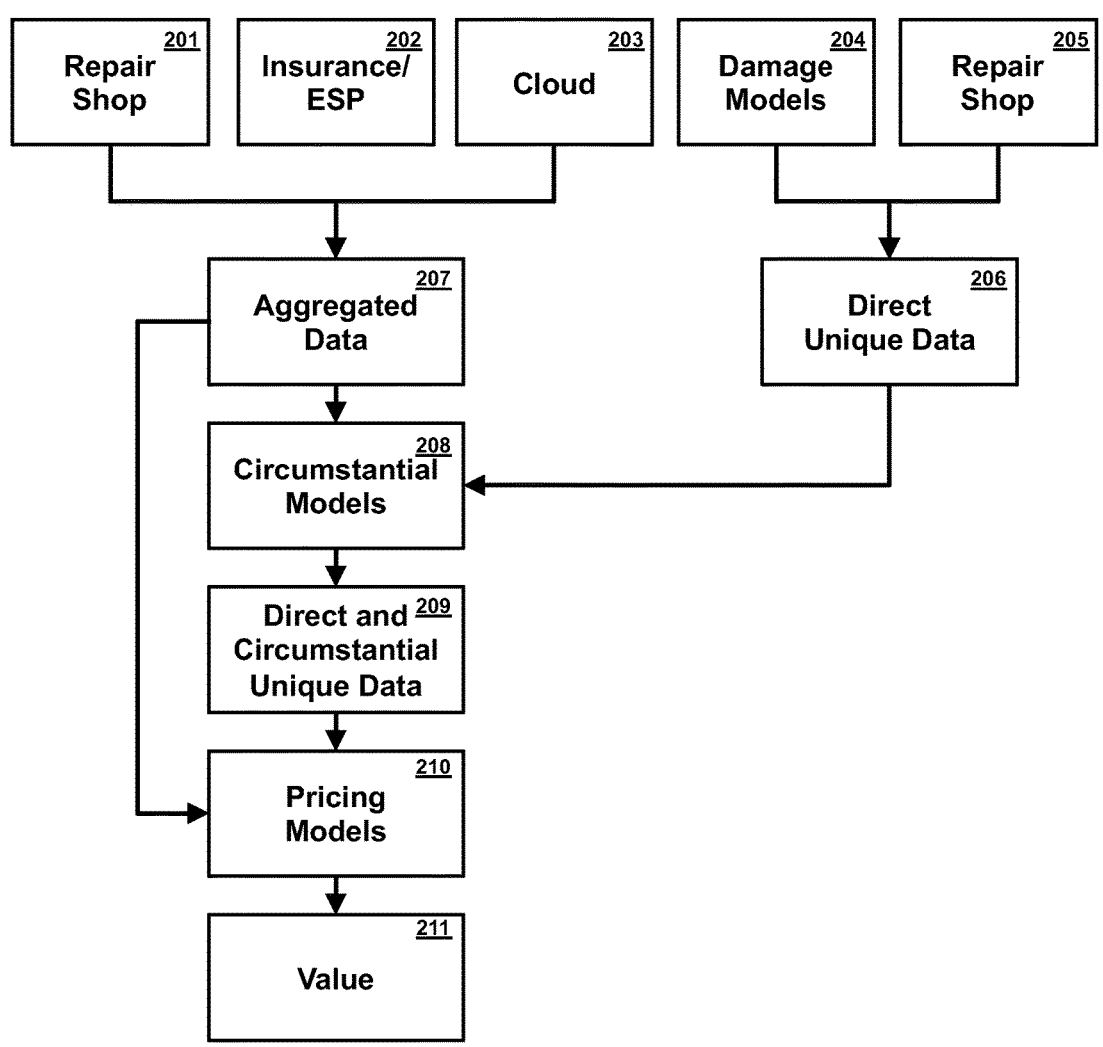
FIG. 2 is a block diagram of a method for finding vehicle value.

Turning to FIG. 2, a method 200 of projecting full vehicle damage is generally shown and illustrated. The model depends on direct unique data 206, or direct data specific to a particular vehicle and aggregated data 207 or data collected from a group of vehicles. The direct unique data 206 includes a directly observed current mechanical status of one particular vehicle. For instance, the unique data may reflect that a particular vehicle has damage to its left front bumper, a fuel injector operating at half capacity, and moderate damage to its front right wheel suspension (as determined by model 113). The method 200 applies the aggregated data to (a) project or estimate other damages to the vehicle through circumstantial models, and (b) project or estimate the vehicle's value in light of all damages (observed and circumstantial).

As stated above, the method assembles data unique to a particular vehicle in 206. The method collects measurements from the vehicle's local sensors in 204. These results may be embodied in results from one or more damage models 204, such as the suspension damage model 113. In 205, the method collects data unique to the vehicle from other sources, such as a local repair shop. Technicians in the repair shop may prepare damage reports listing current defects or mechanical problems. As explained below, this data will eventually be consolidated resulting in a profile or score for each vehicle.

The method generates a structured data set containing the observed or projected unique vehicle damage in 206. As one example, the structured data set may identify a vehicle with a unique ID, such as a VIN. The structured data set may be pre-populated with a component listing corresponding to the specific model of the vehicle. Each component may be associated with one or more data sets indicative of the damage to the vehicle. The data sets may identify the magnitude of the damage, the species of the damage, and the source of the information.

As stated above, the method assembles aggregated data in 207. The aggregated data includes a structured data set listing: (a) prior projected damages to components of a particular vehicle, (b) observed damages to a particular vehicle, and (c) cost of repairing the observed damages.

The method may compare (a) and (b) of the aggregated data 207 to determine how damage projections for a particular component (such as a vehicle suspension) correlate with (i.e., circumstantial predict) damages observed in other components. For example, with reference to an example method 600 of FIG. 6, a certain percentage of cars with projected suspension damage 601 will also exhibit engine damage 602. The method 600 tests the strength of the correlation between the projected suspension damage 601 and the observed engine damage 602 with a circumstantial modeler 603 generate a circumstantial model of engine damage based on suspension damage 604.

Returning to FIG. 2, various circumstantial models 208 (such as circumstantial models 600 and 410) correlate circumstantial damage projections to direct damage observations for vehicle components. In some embodiments, the circumstantial models 208 are tied to one or more of a specific vehicle model or other known data such as general vehicle location, current vehicle health, vehicle age, and ambient conditions around the vehicle. For example, one circumstantial model 208 may predict engine damage based on suspension damage for 2008 sedans located in Southern Ohio (embodied as a collection of corresponding zip codes). The model may also include the strength or confidence level of the projections. As shown in FIG. 4, in some cases, the circumstantial models may be segmented along roads.

After applying the circumstantial models 208 to the unique data 206 of a particular vehicle, the method supplements the unique data with the circumstantial projections in 209. The new set of unique data in step 209 has a structure including an estimated or observed damage to a particular component along with a confidence level of the estimate or observation (the confidence level of an observation may be 100%). In some embodiments, the confidence level of the estimated damage is higher for direct unique data collected in step 206 than for circumstantial unique data generated via the circumstantial damage models in 208.

The method 200 applies price models 210 to the unique data 209. In some embodiments, the price models estimate the cost of repairing a defect. In other embodiments, the price models estimate the diminution in vehicle value associated with a particular defect. The method 200 may build the price models 210 from the aggregated data 207. More specifically, the method 200 may build models that match or correlate, from the aggregated data 207, (b) observed damages to a particular vehicle with (c) cost of repairing the observed damages. By applying the pricing models 210 to each of the damaged components, the method 200 estimates a total value 211 of the particular vehicle.

Figure 3:
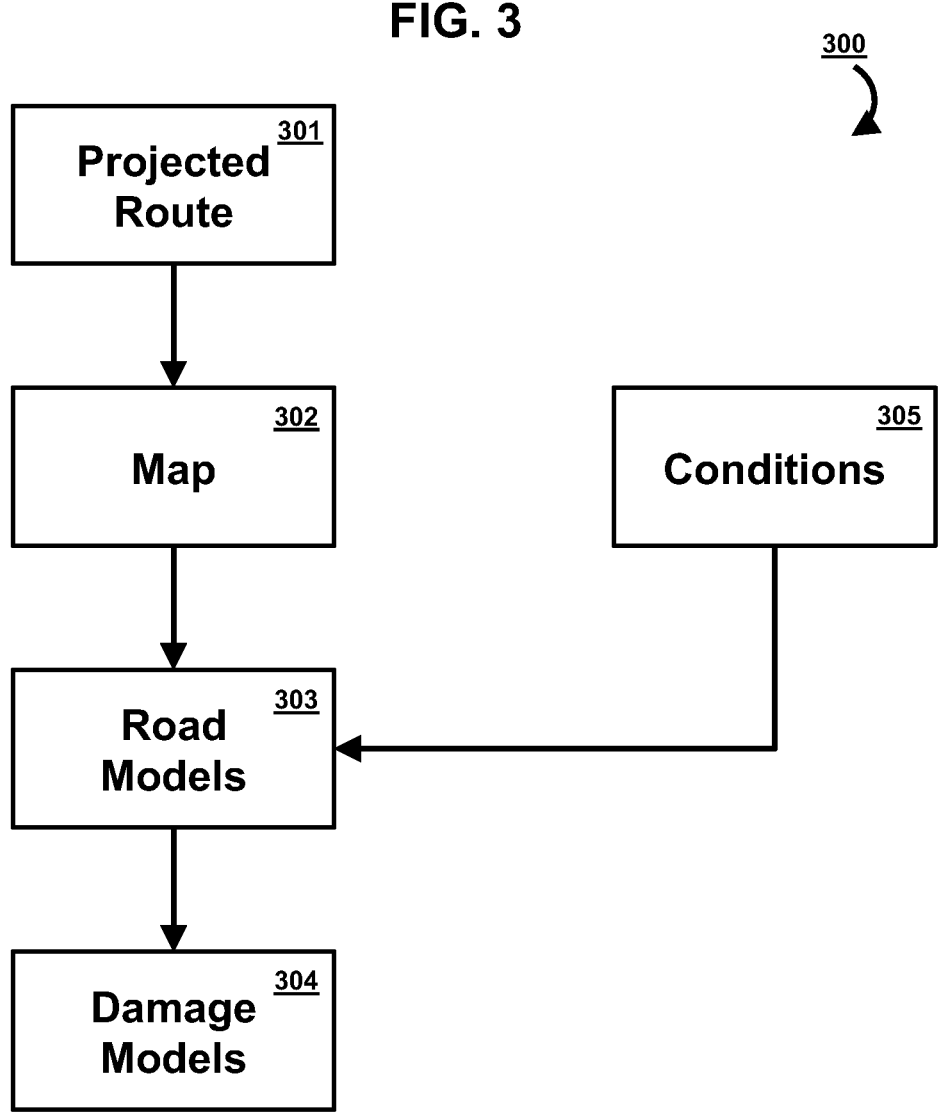
FIG. 3 is a block diagram of a method for predicting vehicle damage according to a projected driving route.

Turning to FIG. 3, a method 300 of simulating vehicle damage over a projected route is generally shown and illustrated. A navigation program learns a driving route 301. The driving route can be user-selected or machine generated in light of a current vehicle location and an input or projected vehicle endpoint. The navigation program recalls one or more road models 303 corresponding to the projected route from a road model map 302. The navigation program (or a separate program) builds or collects these models 303 from vehicle data reported out, for example, in 109 and 111 of FIG. 1. The navigation program also collects conditions 305 relevant to the road model. For example, results of the road model may depend on the weather (including temperature and precipitation), projected vehicle speed (based on driver behavior, traffic, speed limit), and projected vehicle route. One or more damage models 304, such as the suspension damage model 113, project vehicle damage based on the conditions 305 and the road model 303.

In various embodiments, the projected future vehicle damage from traversing a particular route found in FIG. 3 returns to the method 200 via damage models 204. The vehicle now performs method 200 as if the projected damage from damage models 304 is actual direct damage data. The method 200 returns a projected vehicle value 211 based on the vehicle traversing the projected route 301. As a result, the method 200 returns two different values 211: one value 211 corresponding to actual vehicle history (historical value); another value 211 corresponding to the future value of the vehicle after traversing the projected route (future value).

The method 200 may compare (e.g., subtract) the two values to find marginal decrease in value due to the projected route. In various embodiments, the method 200 transmits the values to an external server. The external server prices an insurance policy or an extended service plan based on the marginal decrease in value. The external server transmits the insurance policy or extended service plan to the vehicle. In various embodiments, the method also generates and displays a risk map. The risk map may identify various routes from a current position to a destination. The risk map may illustrate the projected cost of the routes with graphical cues, such as changes in color.

The present disclosure includes various methods. It should be appreciated that these methods may be embodied as non-transient instructions in vehicle memory and executed on the vehicle processor. Alternatively or in addition, these methods may be performed, in whole or in part, on external servers operatively connected to the vehicle.

It should be appreciated that for the purposes of the claims, a "loaded vehicle" is hereby defined to be a vehicle comprising a steering system, an acceleration system with an engine or motor, a braking system including brakes configured to decelerate the vehicle, wheels, wherein at least one of the wheels is configured to receive torque generated by the engine or motor, one or more seats, at least one processor, and memory operatively coupled to the processor. It should be appreciated that the above definition applies, and only applies, when the claims specifically include the term "loaded vehicle."

It should be appreciated that for the purposes of the claims, the term "simultaneously," as it relates to a computer program, conveys that the programs are queued for immediate processing (or being processed) at the same time. The term "simultaneously" does not require that the processor actually simultaneously execute the two programs. In other words, the term "simultaneously" covers a situation where a single core of a processor is tasked with executing two threads of software.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

The invention claimed is:

1. A vehicle damage detector comprising:
    a vehicle with a motor, a suspension, a wheel, a sensor configured to report a suspension displacement;
    processor(s) configured to:
        estimate existing suspension damage based on the reports,
        project marginal future suspension damage based on a route and the existing suspension damage,
        calculate a marginal decrease in vehicle value from taking the projected route.

2. The system of claim 1, wherein the processor(s) are configured to estimate existing damage of a non-suspension component based on the existing suspension damage.

3. The system of claim 2, wherein the processor(s) are configured to estimate the existing damage of said component through circumstantial models derived from aggregated data extracted from a plurality of vehicles.

4. The system of claim 3, wherein the processor(s) are configured to compile the aggregated data and automatically update the circumstantial models.

5. The system of claim 4, wherein the processor(s) are configured to price an insurance policy based on the marginal decrease in vehicle value associated with the route.

6. The system of claim 5, wherein the processor(s) are configured to cause the vehicle to display the priced insurance policies.

7. The system of claim 6, wherein the insurance policies include extended service plans.

8. The system of claim 7, wherein the displacement includes displacements of a shock absorber and a main spring linked to the shock absorber.

9. The system of claim 1, wherein the processor(s) are configured to project net future damage to non-suspension components based on the route and the existing suspension damage.

10. The system of claim 9, wherein the processor(s) are configured to cause the vehicle to display a map illustrating, for each of a plurality of routes, the marginal decrease in vehicle value associated with the route.

11. A method of detecting damage to a vehicle having a motor, a suspension, a wheel, and a sensor configured to report a suspension displacement, comprising:
   with processor(s):
   estimating existing suspension damage based on the reports,
   projecting marginal future suspension damage based on a route and the existing suspension damage,
   calculating a marginal decrease in vehicle value from taking the projected route.

12. The method of claim 11, wherein the processor(s) are configured to estimate existing damage of a non-suspension component based on the existing suspension damage.

13. The method of claim 12, wherein the processor(s) are configured to estimate the existing damage of said component through circumstantial models derived from aggregated data extracted from a plurality of vehicles.

14. The method of claim 13, wherein the processor(s) are configured to compile the aggregated data and automatically update the circumstantial models.

15. The method of claim 14, wherein the processor(s) are configured to price an insurance policy based on the marginal decrease in vehicle value associated with the route.

16. The method of claim 15, wherein the processor(s) are configured to cause the vehicle to display the priced insurance policies.

17. The method of claim 16, wherein the insurance policies include extended service plans.

18. The method of claim 17, wherein the displacement includes displacements of a shock absorber and a main spring linked to the shock absorber.

19. The method of claim 11, wherein the processor(s) are configured to project net future damage to non-suspension components based on the route and the existing suspension damage.

20. A vehicle damage detector comprising:
   a vehicle with a motor, a suspension, a wheel, a sensor configured to report a suspension displacement;
   processor(s) configured to:
   estimate existing suspension damage based on the reports,
   project marginal future suspension damage based on a route and the existing suspension damage,
   calculate a marginal decrease in vehicle value from taking the projected route,
   vary the projected marginal future suspension damage based on the existing suspension damage.

* * * * *